Sept. 15, 1959 H. L. MUELLER 2,904,096
RIM FOR TUBELESS TIRE

Filed May 23, 1955 2 Sheets-Sheet 1

INVENTOR.
HOMER L. MUELLER
BY
*Tenner J. Erstad*
ATTORNEY

Sept. 15, 1959  H. L. MUELLER  2,904,096
RIM FOR TUBELESS TIRE

Filed May 23, 1955  2 Sheets-Sheet 2

INVENTOR.
HOMER L. MUELLER
BY
Tenner & Enstad
ATTORNEY

United States Patent Office 2,904,096
Patented Sept. 15, 1959

2,904,096

RIM FOR TUBELESS TIRE

Homer L. Mueller, Rocky River, Ohio, assignor to American Machine & Foundry Company, a corporation of New Jersey Application May 23, 1955, Serial No. 510,136

5 Claims. (Cl. 152—406)

This invention relates to rims for tubeless pneumatic tires.

One of the problems of using tubeless tires more extensively, especially for trucks, has been the problem of preventing the loss of pressure in the tire, particularly when the tires are subjected to the rough usage that is encountered by tires employed on trucks.

It is an object of this invention to provide a rim assembly for tubeless tires which will be economical to manufacture and will still seal air effectively in the tubeless tire.

Another object of my invention is to provide a rim assembly for a tubeless tire wherein the bottom portion of one tire bead rests on a slip ring and forms an air seal therewith, which allows the bead to move outwardly up against a locking ring and a rubber sealing ring mounted around a rim base to keep air from escaping from between the rim base and the slip ring.

Another object of this invention is to provide a side ring which presses a rubber sealing ring up against a split locking ring to effect an air seal between the rim base and the side ring and the bead of a tubeless tire.

Another object is to provide a slip ring on which the bead of a tubeless tire is supported, wherein the slip ring passes over an endless sealing ring positioned in the gutter of the rimless base, and moves up against a split locking side ring against which the bead of the tubeless tire rests, so as to form an air seal between the endless flat bead ring and the rim base.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
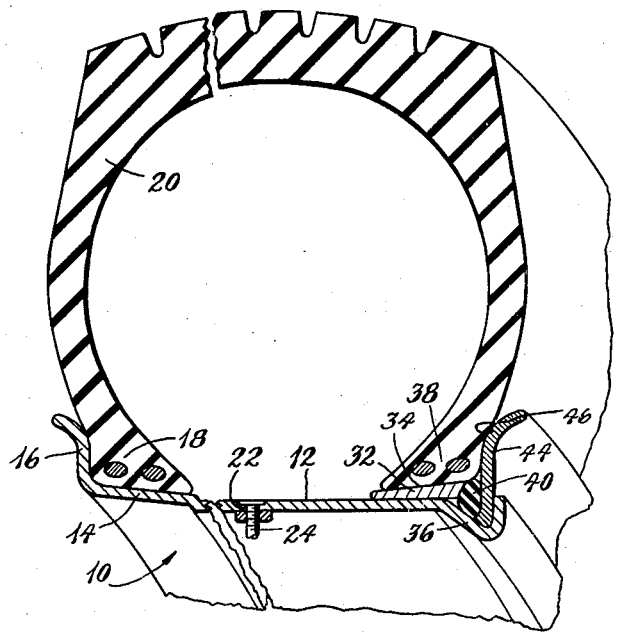
Figure 1 is a fragmentary cross-sectional perspective view of a conventional tubeless pneumatic tire mounted on a tubeless tire rim assembly embodying the invention.

The rim I have chosen to illustrate the invention consists of a flat endless rim base 10 having a flat portion 12 and an inclined portion 14 which may be provided with a suitable taper such as 5 degrees. The inclined portion 14 of the rim base has an upwardly extending flange 16 conforming to the outside configuration of the tire bead 18 of a conventional tubeless tire 20. Since the tire bead seat 14 and the upwardly extending flange 16 conform to the configuration of the bead 18, when the tire bead is forced outwardly because of the inflation of the tire, the bead squeezes and seats itself tightly on the incline 14 and up against the flange 16, so as to form an air tight seal therewith.

The center portion of the base has a hole 22 formed therein in which is mounted a conventional valve stem 24 having a flange 26 under which is placed an air sealing washer or gasket 28. The valve stem 24 is tightly secured to the rim base 10 by means of a nut 30 to prevent air from leaking out through the hole 22 when the tire has been inflated through the valve stem 24.

An endless flat bead seat ring 32 having an inclined bead seat 34 which is of the same degree of taper as the tapered side 14 is mounted on the rim base 12. There is a slight clearance of approximately 1/32 to 1/16 inch between the flat rim base 12 and the flat bead seat ring 32, so as to allow the bead seat ring 32 to freely move in and out over the flat portion 12 of the rim base 10. The flat portion of the rim base 10 is surrounded on its exterior surface by a downwardly extending gutter 36 after the tubeless tire 20 has been slipped over the rim base 10. The flat bead seat ring 32 is moved into position under the bead 38 and an endless sealing ring 40 is positioned in the gutter 36 up against the edge of the flat bead seat ring 32.

The portion of the flat bead seat ring 32 which engages with the sealing ring 40 may be formed with a slight curve or taper 42 so as to effect an inward squeezing action on the sealing ring 40 when the curved portion 42 of the flat bead seat ring 32 is brought into engagement therewith.

A split locking ring 44 having a curved flange 46 corresponding to the configuration of the side of the tire bead 38 is mounted in the gutter 36 of the ring base 10, and is held in position by the upwardly extending flange 48 of the gutter.

When the tubeless tire is inflated the bead seat 38 squeezes against the tapered incline 34 of the flat bead seat ring 32 to move up against the sealing ring 40. The sealing ring 40 is then confined between the curved surface 42, the gutter 36, the split side ring 40, and the corner portion of the bead 38. The greater the pressure in the tire, the greater will be the pressure exerted against the inclined portion 34 of the flat bead seat ring 32 by the tire bead 38. This in turn causes the bead 38 to move outwardly up against the curved flange 46, thereby effecting an airtight seal therewith.

When the bead seat ring 32 is moved outwardly by said tire pressure it squeezes the endless sealing ring 40 up against the bead 38, the gutter 36, the split ring 44, and the curved portion 42 of the bead seat ring 32, thereby preventing air from escaping at this point of the rim assembly. This invention has the advantage that the tire bead comes into direct contact with an endless sealing ring to effect an airtight seal therewith.

When the flat bead seat ring 32 moves sidewise it effects a wedging action against the sealing ring 40, and the greater the pressure, the greater the sealing action attained, because the sealing ring will be squeezed upwardly into tight contact directly with the bead of the tire which pushes downwardly thus sealing the bead directly with the gutter 36 of the rim base, thereby preventing the escape of any air.

Figure 2:
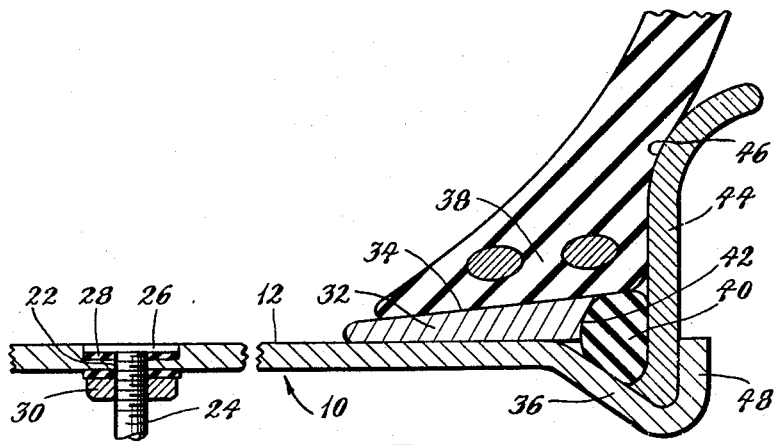
Figure 2 is a fragmentary cross-sectional detail on an enlarged scale, showing the novel features of the tire rim.

As will be apparent from an inspection of Figs. 1 and 2, the component elements of applicant's apparatus are very simple to make. The rim base 10 is quite similar to conventional rims, and while the flat bead seat ring 32 is different from that currently used, it is simple to make and reliable in operation and does not add to the cost of making rims for tubeless truck tires. By moving the tire bead 38 directly into contact with the split locking ring 46, the structure of the rim base assembly has been simplified by combining the flange of a conventional side ring with that of a split locking ring. By placing the endless sealing ring 40 in the position where it is squeezed by the edge of the endless flat bead seat ring 32, it effects a tight air seal with the flat bead seat ring 32 and the gutter 36.

Figure 3:
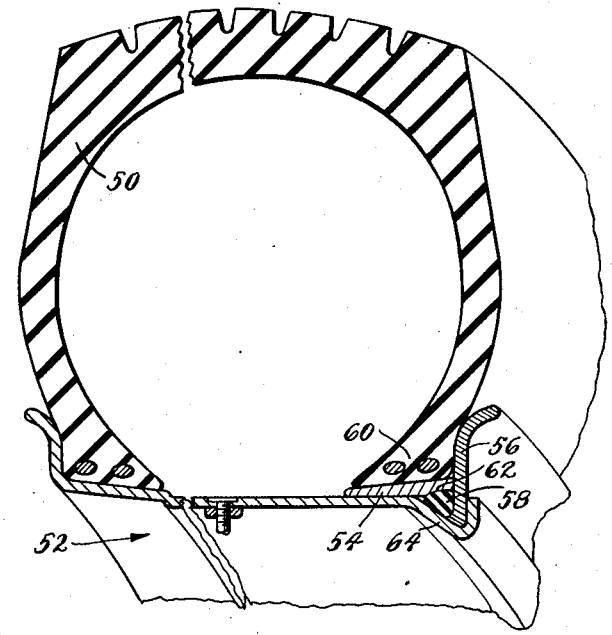
Figure 3 is a fragmentary cross-sectional perspective view of a modified form of a tubeless tire rim embodying the invention.

In the modified form of my invention, I have shown in Fig. 3 a conventional tubeless tire 50 and a rim base 52 which is similar to the structural components shown in Figs. 1 and 2. In this modification, however, the endless flat bead seat ring 54 is so arranged that the edge thereof moves outwardly into direct contact with the split locking side ring 56, and in so doing wedges the endless sealing ring 58 which may be made of rubber or other suitable material.

Figure 4:
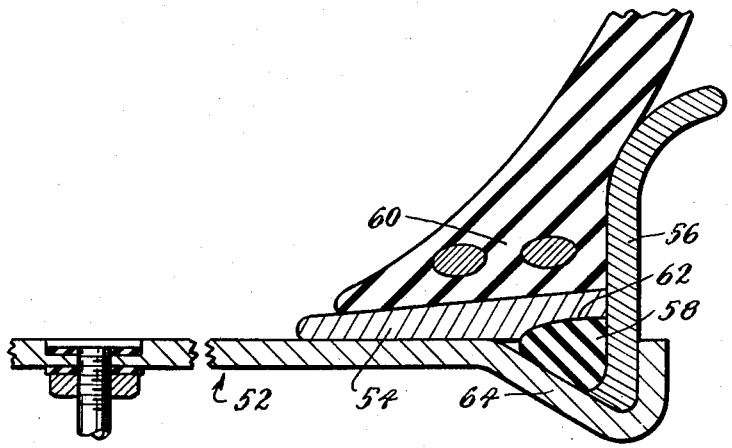
Figure 4 is a fragmentary cross section in detail on an enlarged scale showing the novel features of the modified form of the tire rim.

As shown in Fig. 4 the tire bead 60 rests on the endless flat bead seat ring 54, and when the tire is inflated, the bead 60 and the endless flat bead seat ring 54 will move outwardly. The tapered portion 62 of the flat bead seat ring 54 will come into engagement with the endless sealing ring 58 squeezing it downwardly against the inwardly extending declined gutter 64 and the bottom portion of the split locking side ring 56 so as to effect an airtight seal between the flat bead seat ring 54 and the gutter 64.

This embodiment of the invention has the advantage that it avoids direct contact between the tire bead and the sealing gasket which may be desirable when employing certain types of material for the endless sealing ring 58, instead of having direct contact between the bead 60 and the sealing ring 58.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A rim assembly for tubeless tires comprising a rim base having a tapered bead seat and a flange formed on one side of said base conforming to the configuration of a bead of a tubeless tire for effecting an airtight seal between the bead and the bead seat and flange of the rim base, a gutter formed around the opposite side of said rim base, a flat endless ring having a bead seat thereon, said ring having an inside diameter which permits it to freely slide over the rim base, an endless sealing gasket mounted in said gutter, and a split locking side ring mounted in said gutter, and having an upwardly extending flange against which the other tire bead of said tubeless tire comes in contact when the tubeless tire is inflated, said endless flat bead ring having an edge which engages with the endless sealing gasket to press the same up against said split locking side ring so as to force the sealing gasket downwardly against the gutter of the rim base and upwardly against the bead of said tubeless tire to effect an air seal between the bead and the rim base.

2. A rim assembly for tubeless tires comprising a rim base having a flange on one side against which a bead of a tubeless tire comes to rest to form an air seal therewith, a gutter extending around the other side of said rim base, an endless flat bead seat ring band mounted under the opposite bead of said tire and being slideable over said gutter and said rim base, an endless sealing ring mounted in said gutter up against the edge of said endless flat bead seat ring, a split locking side ring positioned around said gutter up against the side of said sealing ring opposite to that engaged by said bead seat ring, and means for inflating said tubeless tire to bring said flat bead ring up against said sealing ring to squeeze the sealing ring against the gutter, the split locking side ring, and the exterior surface of said bead to effect an airtight seal between the rim base and the flat bead ring.

3. A rim assembly for tubeless tires comprising a rim base, a flange formed on one side of said rim base for engaging with one bead of a tubeless tire, a gutter formed around the opposite side of said rim base, an endless flat flangeless bead seat ring slideably mounted over the opposite side of said rim base for supporting the other bead of said tubeless tire, a split locking ring mounted around said opposite side of said rim base, and an endless sealing ring positioned between said split locking ring, the rim base and the endless flat flangeless bead seat ring and the tire bead, and means mounted on said rim base for inflating said tubeless tire to bring said endless flat bead seat ring into engagement with said sealing ring to squeeze the sealing ring against the split locking ring and downwardly against the gutter and upwardly against the bead to effect an air seal between the bead and the rim base.

4. A rim assembly for tubeless tires comprising a rim base having a flange on one side for effecting air air seal with one bead of a tubeless tire, a split locking side ring mounted on the other side of said rim base, a gutter for supporting said split locking side ring, a flat endless and flangeless bead support formed to slide over said gutter and said rim base to support the other bead of a tubeless tire, an endless sealing ring, said bead support having a cam surface for engaging with said sealing ring to squeeze the same against said gutter when said sealing ring is moved outwardly, the endless sealing ring is positioned between the endless flat bead seat, the split locking side ring, and the gutter for effecting an air seal between the endless flat bead support, the split side locking ring, the tire bead and the gutter, and means mounted on said rim base for inflating said tubeless tire to move said endless flat bead support outwardly into contact with said sealing ring to squeeze the sealing ring against the split locking ring and downwardly against the gutter and upwardly against the bead to effect an air seal between the bead and the rim base.

5. A rim assembly for a tubeless tire comprising a rim base, a bead seat and flange formed on one side of said rim base for engaging one bead of a tubeless tire to effect an airtight seal therewith, a gutter formed around the opposite side of said rim base, an endless, flangeless bead seat ring slideably mounted on said rim base for supporting the opposite bead of said tubeless tire, an endless sealing gasket positioned around said gutter and engaged by a cam surface formed on said endless flangeless bead seat ring, and a split side locking ring positioned around said gutter to effect engagement with said sealing gasket when the tire is inflated to cause said endless sealing gasket to be squeezed between the bead seat ring, the split side ring, as well as downwardly against the gutter and upwardly against the tire bead to effect an air seal between the bead and the rim base.

References Cited in the file of this patent

UNITED STATES PATENTS

| 1,539,317 | Johnson | May 26, 1925 |
| 2,685,907 | Waddell | Aug. 10, 1954 |
| 2,822,017 | Herzegh | Feb. 4, 1958 |

FOREIGN PATENTS

| 1,080,891 | France | June 2, 1954 |

(Corresponding Great Britain 725,767, Mar. 9, 1955)

| 1,085,906 | France | Aug. 4, 1954 |